US007299090B2

(12) United States Patent
Koch

(10) Patent No.: US 7,299,090 B2
(45) Date of Patent: Nov. 20, 2007

(54) ARRANGEMENT FOR MEASURING THE BODY TEMPERATURE OF A LIVING ORGANISM

(75) Inventor: Jochim Koch, Ratzeburg (DE)

(73) Assignee: Draeger Safety AG & Co. KGaA, Luebeck (DE)

( * ) Notice: Subject to any disclaimer, the term of this patent is extended or adjusted under 35 U.S.C. 154(b) by 0 days.

(21) Appl. No.: 11/339,577

(22) Filed: Jan. 26, 2006

(65) Prior Publication Data

US 2006/0173375 A1 Aug. 3, 2006

(30) Foreign Application Priority Data

Feb. 3, 2005 (DE) ...................... 10 2005 004 933

(51) Int. Cl.
*A61B 5/05* (2006.01)

(52) U.S. Cl. ...................................................... 600/547

(58) Field of Classification Search ................ 600/547, 600/549

See application file for complete search history.

(56) References Cited

U.S. PATENT DOCUMENTS 5,200,736 A * 4/1993 Coombs et al. ............. 340/586
5,735,604 A 4/1998 Ewals et al.
6,547,745 B1 * 4/2003 Rubinstein .................. 600/549
6,847,913 B2 * 1/2005 Wigley et al. .............. 702/131
6,889,559 B2 * 5/2005 Gimson ....................... 73/861
6,929,611 B2 8/2005 Koch
2002/0173730 A1 * 11/2002 Pottgen et al. .............. 600/549
2002/0191937 A1 * 12/2002 Knox et al. ................. 385/135

FOREIGN PATENT DOCUMENTS

DE 100 38 247 5/2001
GB 2 131 175 6/1984

* cited by examiner

*Primary Examiner*—Max F. Hindenburg
*Assistant Examiner*—H. Q. Nguyen
(74) *Attorney, Agent, or Firm*—Walter Ottesen

(57) ABSTRACT

An arrangement for measuring the body temperature of a living organism includes a sensor housing containing a first temperature sensor for measuring the skin temperature of the living organism, a second temperature sensor and an evaluation unit. The first temperature sensor is placed on the skin of the body and the second temperature sensor is arranged thermally insulated on the side of the first temperature sensor facing away from the skin and is at a spacing relative to the first temperature sensor. The evaluation unit computes the body temperature in accordance with a pregiven temperature formula which contains a temperature difference from the temperatures measured by the first temperature sensor and the second temperature sensor. A compensation unit is provided in such a manner that a lost heat flow ($q_{sa}$) is considered which occurs during the measurement operation.

5 Claims, 3 Drawing Sheets

ARRANGEMENT FOR MEASURING THE BODY TEMPERATURE OF A LIVING ORGANISM

CROSS REFERENCE TO RELATED APPLICATION

This application claims priority of German patent application no. 10 2005 004 933.8, filed Feb. 3, 2005, the entire contents of which is incorporated herein by reference.

FIELD OF THE INVENTION

The invention relates to an arrangement for measuring the body temperature of a living organism. The arrangement includes a sensor housing containing a first temperature sensor for detecting the skin temperature of the living organism and a second temperature sensor as well as an evaluation unit. The first temperature sensor can be applied to the skin of the body and the second temperature sensor is arranged on the side of the first temperature sensor facing away from the skin so as to be thermally insulated with respect thereto and is in spaced relationship to the first temperature sensor. In the evaluation unit, the body temperature is computed in accordance with a pregiven temperature formula which contains a temperature difference of the temperatures measured by the first temperature sensor and the second temperature sensor.

BACKGROUND OF THE INVENTION

German patent publication 100 38 247 discloses an arrangement for measuring the body temperature of a living organism wherein a first temperature sensor and a second temperature sensor are mounted in a housing. During the measuring operation, the first temperature sensor is applied directly to the skin of the body and detects the skin temperature. The second temperature sensor is arranged so as to be thermally insulated and spaced relative to the first temperature sensor. The second temperature sensor is disposed on a side of the first temperature sensor facing away from the skin. The second temperature sensor determines the temperature of the ambient air of the body.

From U.S. Pat. No. 6,929,611, it is known to integrate in a protective helmet an arrangement for measuring the body temperature of a living organism with this arrangement being known from DE 100 38 247 C2. A first temperature sensor for detecting the skin temperature of a person and a second temperature sensor are integrally arranged in a headband of the protective helmet. The second temperature sensor is mounted thermally insulated on a side of the first temperature sensor which faces away from the skin and is arranged in spaced relationship to the first temperature sensor. An evaluation unit is provided to compute the instantaneous body temperature of the person in accordance with a pregiven temperature formula in dependence upon constant parameters and a temperature difference measured by the first temperature sensor and the second temperature sensor.

With respect to the known arrangement, it is disadvantageous that an erroneous determination of the body temperature can occur in dependence upon ambient and geometric conditions.

SUMMARY OF THE INVENTION

In view of the above, it is an object of the invention to provide an arrangement for measuring the body temperature of a living organism in such a manner that the accuracy of the measuring operation is improved.

The arrangement of the invention is for measuring the body temperature of a living organism. The arrangement includes: a housing; a first sensor mounted in the housing and disposed in contact engagement with the skin of the living organism for measuring a first temperature; a second sensor mounted in the housing for measuring a second temperature; the first sensor having a side facing away from the skin; the second sensor being mounted at a distance from the side of the first sensor; insulating means disposed between the first and second sensors for thermally insulating the first and second sensors from each other and conducting a main thermal flow therebetween from which a thermal loss flow ($q_{sa}$) branches off while measuring the body temperature; compensation means for determining or estimating the thermal loss flow ($q_{sa}$); and, an evaluation unit operatively connected to the compensation means so as to permit consideration of the thermal loss flow ($q_{sa}$) thereby increasing the accuracy of the measurement of the body temperature.

According to the invention, a compensation unit is provided which makes it possible for the evaluation unit to compute a body temperature while considering a lost heat flow occurring within the sensor housing. The compensation unit considers especially the lost heat flow which results in that the heat flow, which is outputted from the body to the sensor housing of the arrangement, is not completely conducted over the first temperature sensor to the second temperature sensor. A more precise measurement result can be obtained from the determination or estimate of the lost heat flow.

According to a preferred embodiment of the invention, the compensation unit is configured in that a compensation term is assigned to the temperature formula for computing the body temperature and this compensation term is dependent upon a boundary temperature and/or a heat transfer between the sensor housing and the ambient. The boundary temperature is measured at the outer wall of the sensor housing. In this way, the previous temperature formula can be hereby retained which is simply supplemented by the compensation term. The previous temperature formula therefore functions as a basis for the temperature formula of the invention which expands the hitherto existing temperature formula by the compensation term.

According to a first variation of the invention, a third temperature sensor is provided which is mounted in the region of the outer wall of the sensor housing. The third temperature sensor measures the boundary temperature of the sensor housing at the transition to the ambient. In connection with the temperatures, which are measured by the first temperature sensor and the second temperature sensor, as well as additional geometry-dependent or material-dependent constant parameters, a precise body temperature determination can take place which is independent of the ambient conditions, especially, independent of the temperature conditions during the measuring operation. The compensation term can be determined relatively precisely because of the determination of the boundary temperature of the sensor housing.

According to a second variation of the invention, the compensation term can be determined by estimating or computing the boundary temperature of the sensor housing.

In this way, the boundary temperature is determined by means of a boundary temperature formula in dependence upon a heat transfer constant between the wall of the sensor housing and the ambient. A value in a pregiven range is assigned to the heat transfer constant. This value range is dependent upon the magnitude of an air flow in the region of the housing wall. By assuming a value of the heat transfer constant in the usual value range, a relatively precise measurement result can be obtained exclusively in dependence upon the measuring quantities of the temperatures determined by the first temperature sensor and the second temperature sensor.

BRIEF DESCRIPTION OF THE DRAWINGS

The invention will now be described with reference to the drawings wherein.

DESCRIPTION OF THE PREFERRED EMBODIMENTS OF THE INVENTION

An arrangement of the invention for measuring the body temperature of a living organism, especially a person, includes a sensor housing 1 (measuring housing) which is integrated into a headband of a protective helmet for determining the body temperature of the person. The integration into a headband of a protective helmet is disclosed in U.S. Pat. No. 6,929,611 which is incorporated herein by reference.

Figure 1:
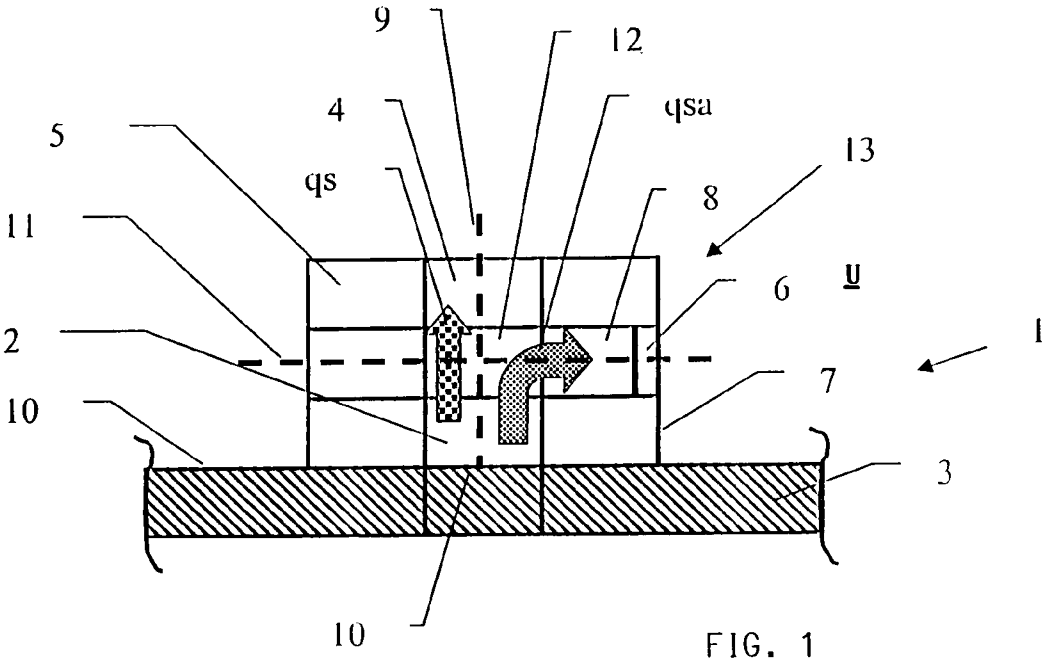
FIG. 1 is a schematic longitudinal section view through a sensor housing of the arrangement of the invention with the arrangement being disposed in a mounting position on the skin of a person.

The sensor housing 1 is so positioned on the headband (not shown) that a first temperature sensor 2, which is mounted in the sensor housing 1, lies directly on the scalp 3 of the person as shown in FIG. 1. The first temperature sensor 2 detects a skin temperature $T_{h1}$ of the head. On a side of the first temperature sensor 2 facing away from the skin 3, a second temperature sensor 4 is mounted within the sensor housing 1 and this second temperature sensor is mounted at a distance to the first temperature sensor 2. When the arrangement is mounted in a protective helmet, the second sensor 4 measures the ambient-near temperature within the helmet. On the other hand, the arrangement can be mounted in clothing and the second sensor 4 then measures the ambient-near temperature in the clothing.

The intermediate space between the first temperature sensor 2 and the second temperature sensor 4 is filled with an insulating material 12 such as foam material or insulating wool. The second temperature sensor 4 is therefore mounted so as to be thermally insulated with respect to the first temperature sensor 2.

Figure 2:
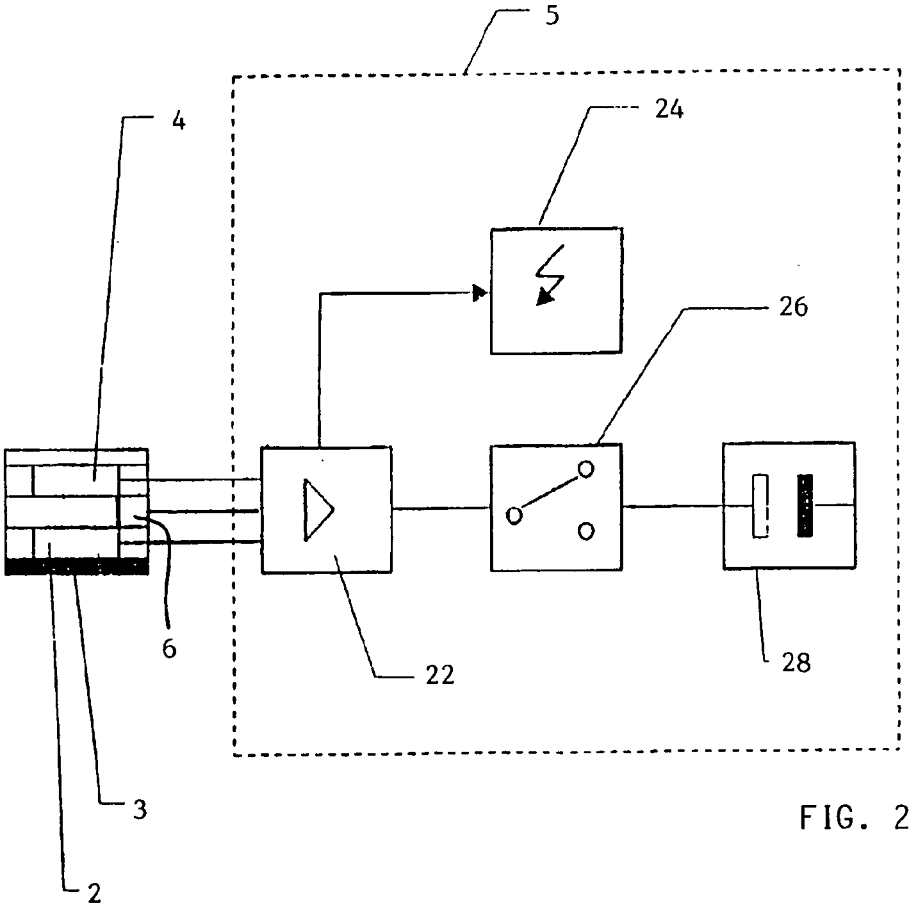
FIG. 2 is a schematic representation showing the arrangement of FIG. 1.

An evaluation unit 5 is integrated into the sensor housing 1 and is an integral part of the arrangement of the invention. The evaluation unit 5 is electrically coupled to the first temperature sensor 2 and the second temperature sensor 4 as shown in the schematic of FIG. 2. The evaluation unit 5 essentially has a computing unit 22 provided with an amplifier, a transmission/receiving unit 24, a contact switch 26 and a current supply unit 28. The evaluation unit 5 can be switched on and off by means of the switch 26. For example, the switch 26 can be configured as a pressure switch as known per se so that, after applying the headband, the evaluation unit 5 and therefore the arrangement are automatically switched on.

Figure 5:
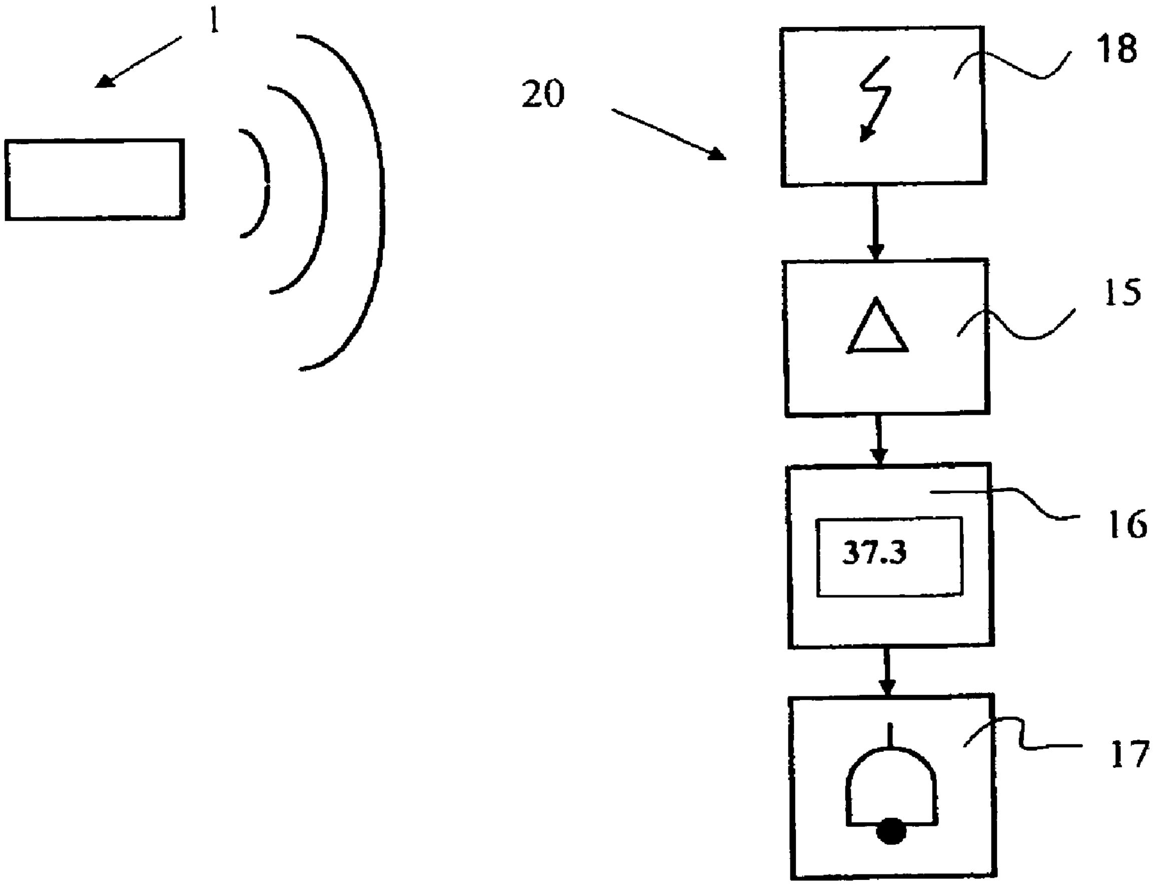

Measurement data are determined from temperature sensors 2 and 4 and are evaluated in the evaluation unit 5. These measurement data are transmitted to the remote receiving unit 20 shown in FIG. 5 by the transmission/receiving unit 24 of the evaluation unit 5. The remote receiving unit 20 includes a transmission/receiving unit 18, an evaluation circuit 15, a display device 16 and an alarm unit 17. The receiving unit 20 can be disposed on the body of the wearer of the headband so that the person, who carries the arrangement, can directly read off the measured body temperature. Alternatively, the receiving unit 18 can also be accommodated in a central monitoring station.

It is known to compute the body temperature $T_c$ of a person in the evaluation unit 5 in accordance with the temperature formula:

$$T_c = T_{h1} + \frac{K_s}{K_g} \cdot (T_{h1} - T_{h2}),$$

wherein:

$T_c$=core temperature, body temperature;

$T_{h1}$=skin temperature measured by the first temperature sensor 2;

$T_{h2}$=temperature measured by the second temperature sensor 4;

$K_s$=thermal conductivity coefficient of the sensor housing;

$K_g$=thermal conductivity coefficient of human tissue.

To increase the accuracy of the measurement, a compensation unit 13 is provided in accordance with the invention which compensates especially measurement errors as a consequence of varying ambient conditions. In a first embodiment of the invention, the temperature compensation unit 13 is formed essentially by a third temperature sensor 6 which is mounted in the region of an outer wall 7 of the sensor housing 1. The third temperature sensor 6 is connected to the computer/amplifier unit 22 and detects a boundary temperature $t_{sa}$ of the sensor housing 1. Preferably, the third temperature sensor 6 is disposed in a side region 8 of the sensor housing 1. This side region 8 is arranged transversely of an imaginary connecting line 9 between the first temperature sensor 2 and the second temperature sensor 4. The imaginary connecting line 9 between the first temperature sensor 2 and the second temperature sensor 4 extends essentially orthogonally to a support surface 10 of the scalp 3. The side region 8 extends essentially at a spacing to the connecting line 9 and runs in a symmetry plane 11 of the insulating material 12 which lies between the first temperature sensor 2 and the second temperature sensor 4. In this way, the third temperature sensor 6 is in a position to measure the temperature $t_{sa}$ on the outer surface of the insulating material 12.

By measuring the sensor housing outer temperature $t_{sa}$ by means of the third temperature sensor 6, the known temperature formula $T_c$ can be expanded by a compensation term 14 which considers a lost heat flow $q_{sa}$. The lost heat flow $q_{sa}$ is branched off from a main heat flow $q_s$ running perpendicularly to the support surface 10. This lost heat flow $q_{sa}$ flows in the mid region between the first temperature sensor 2 and the second temperature sensor 4 transversely to the connecting line 9 to the outer wall 7. By coupling the compensation term 14 to the known temperature formula $T_c$, an expanded temperature formula $T_c'$ results for measuring the body temperature of a person as follows:

$$T_c' = T_{h1} + \frac{K_s}{K_g}\cdot(T_{h1} - T_{h2}) + \underbrace{\frac{K_{iso}}{K_g}\cdot\frac{A_{iso\_m}}{A_s}\cdot\left(\frac{T_{h1} + T_{h2}}{2} - t_{sa}\right)}_{14}$$

wherein:

$K_{iso}$=thermal conductivity coefficient of the outer insulation;

$A_{iso\_m}$=surface area of the outer insulation (same elevation as the insulation between the sensors);

$A_s$=end face of the sensor having the diameter of the insulation;

$t_{sa}$=temperature at the outer surface of the insulation as measured by the third temperature sensor 6.

Figure 3:
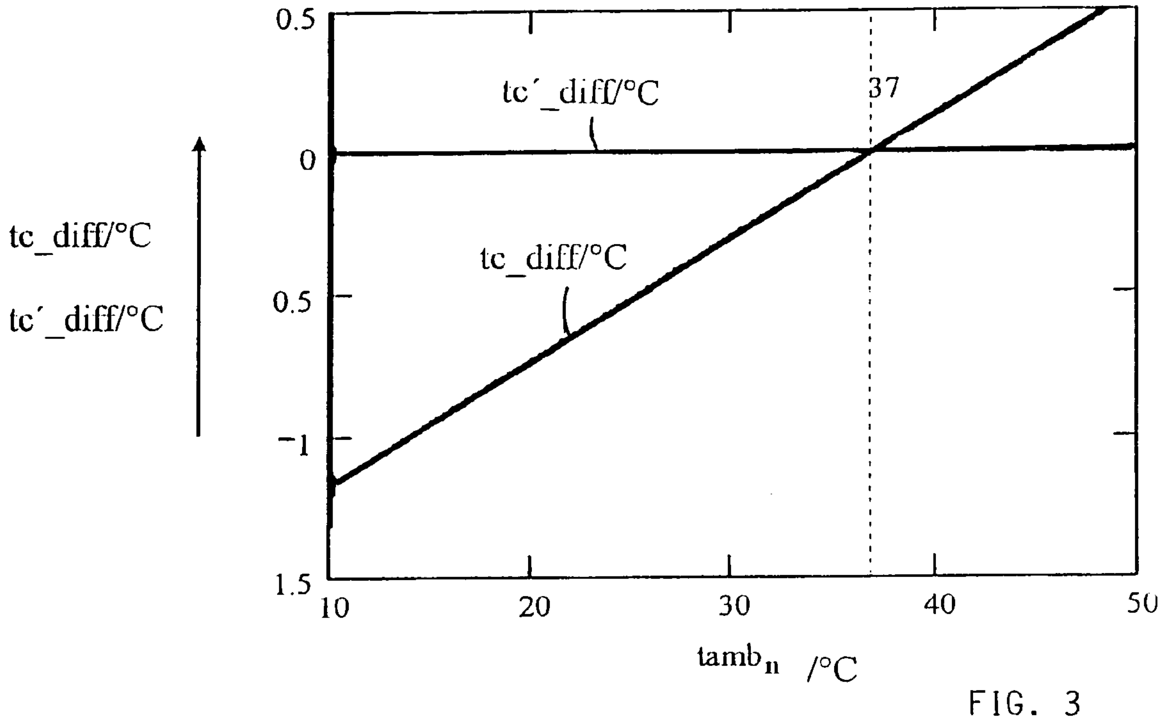
FIG. 3 is an error curve of the arrangement of a first embodiment of the invention in dependence upon the ambient temperature.

The heat flow $q_{sa}$ flows off laterally transversely between the first temperature sensor 2 and the second temperature sensor 4 from the main heat flow $q_s$. With the compensation term 14, this heat flow $q_{sa}$ can be considered. As shown in FIG. 3, the error can be compensated which results in dependence upon the ambient temperature $t_{amb}$ present in an ambient U.

In FIG. 3, on the one hand, the deviation $t_{c\_diff}$ is shown which results in dependence upon the ambient temperature $t_{amb}$ as the difference of the core temperature $T_c'$, which is computed by means of the known temperature formula, and the actual core temperature. On the other hand, the deviation $t_c'_{\_diff}$ is shown which results as a difference of the value, which is determined by the expanded temperature formula $T_c'$, to the actual core temperature.

The known temperature formula $T_c$ exhibits a correct value in the example only at an ambient temperature $t_{amb}$ of 37° C. At a higher ambient temperature $t_{amb}$ there results too high a body temperature value $T_c$ and, at a lower ambient temperature $t_{amb}$, too low a body temperature value $T_c$ is computed. By considering the compensation term 14, the temperature error, that is, the temperature difference $t_c'_{\_diff}$, is always zero.

According to a second embodiment of the invention, the boundary temperature $t_{sa}$, which represents the temperature at the outer wall 7, can be determined in accordance with the boundary temperature formula:

$$t_{sa} = \frac{\alpha\cdot T_{h2} - K_s\cdot(T_{h1} - T_{h2}) + K_{iso}\cdot\left(\frac{T_{h1} + T_{h2}}{2}\right)}{\alpha + K_{iso}},$$

wherein: α=thermal conductive constant of the outer wall of the sensor housing 1 to the ambient U. In this second embodiment, the temperature $t_{sa}$ is determined without the third temperature sensor 6.

Figure 4:
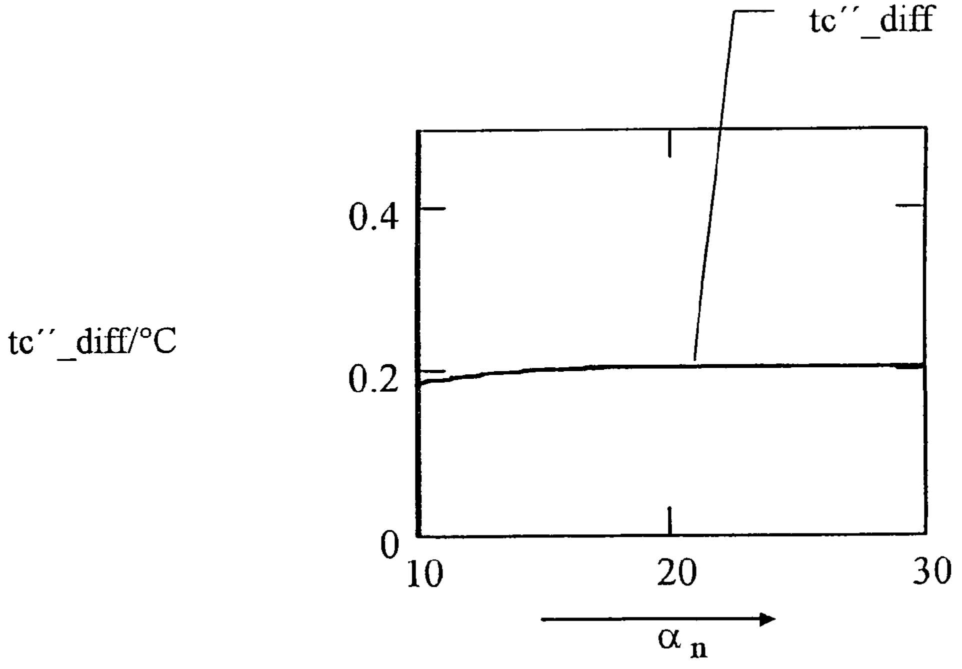
FIG. 4 is an error curve of an arrangement of a second embodiment of the invention in dependence upon a heat transfer constant α; and, FIG. 5 is a schematic of a remote receiving unit to which measurement data are transmitted by a transmission/receiving unit of the evaluation unit in the sensor housing shown in FIG. 1.

The boundary temperature $t_{sa}$ is essentially dependent upon the skin temperature $T_{h1}$, which is measured by means of a first temperature sensor 2, and the temperature $T_{h2}$ which is determined by means of the second temperature sensor 4. The boundary temperature results by setting thermal flow equations equal to each other in accordance with the ambient temperature $t_{amb}$. The constant parameters ($K_s$, $K_{iso}$) are known from the temperature formula $T_c'$ and are geometry-dependent and/or material-dependent. In the equation, a dependency is present from the thermal transfer constant α in addition to the constant parameters ($K_s$, $K_{iso}$). For the thermal transfer constant α, a value range between 10 $W/m^2\cdot 1/K$ and 30 $W/m^2\cdot 1/K$ is assumed. It can be assumed that, as a rule, in the measurement, the thermal transfer constant α lies in this value range. Also, for an assumed large deviation of the thermal transfer constant α in this region, there results no significant error deviation as shown in FIG. 4. There, the difference temperature $t_c{}^*{}_{\_diff}$ is plotted, which results as the difference between the core temperature $T_c'$ to the actual core temperature $t_c'_{\_diff}$. The core temperature $T_c'$ is determined by computation of the temperature $t_{sa}$ in accordance with the boundary temperature formula. The temperature deviation lies in a region of 0.2° C.

In accordance with the second embodiment of the invention, the computation of the body temperature $T_c'$ takes place in the evaluation unit 5 of the sensor housing 1. The skin temperature values $T_{h1}$ and the temperature values $T_{h2}$ function as input values which are determined by the temperature sensors 2 and 4.

In accordance with an embodiment of the invention not shown, the body temperature $T_c'$ can be computed in accordance with the first and second embodiment of the invention also in a remote evaluation unit, for example, in the receiving unit.

It is understood that the foregoing description is that of the preferred embodiments of the invention and that various changes and modifications may be made thereto without departing from the spirit and scope of the invention as defined in the appended claims.

What is claimed is:

1. An arrangement for measuring the body temperature of a living organism, the arrangement comprising:

a housing;

a first sensor mounted in said housing and disposed in contact engagement with the skin of the living organism for measuring a first temperature;

a second sensor mounted in said housing for measuring a second temperature;

said first sensor having a side facing away from said skin;

said second sensor being mounted at a distance from said side of said first sensor;

insulating means disposed between said first and second sensors for thermally insulating said first and second sensors from each other and conducting a thermal flow therebetween from which a thermal loss flow ($q_{sa}$) branches off while measuring said body temperature;

compensation means for determining or estimating said thermal loss flow ($q_{sa}$);

an evaluation unit operatively connected to said compensation means so as to permit consideration of said thermal loss flow ($q_{sa}$) thereby increasing the accuracy of the measurement of said body temperature;

wherein said evaluation unit determines said body temperature with the aid of a formula and said compensation means is a compensation term which expands said formula;

wherein said housing has an outer wall; and, said compensation term is dependent upon at least one of a boundary temperature ($t_{sa}$) at said outer wall of said housing and a thermal conductance ($\alpha$) between said housing and the ambient (U);

said arrangement further comprising a third sensor mounted in the region of said outer wall for measuring said boundary temperature and said compensation term being formed in dependence upon said boundary temperature ($t_{sa}$) measured by said third sensor;

wherein said compensation term is formed exclusively by coupling of constant parameters ($K_{iso}$, $K_g$, $A_{iso\_m}$, $A_s$, $\alpha$, $K_s$) and the skin temperature ($T_{h1}$) measured by said first sensor and the further temperature ($T_{h2}$) measured by said second sensor and said formula for measuring body temperature ($T_c'$) including said compensation term is given by:

$$T_c'=T_{h1}+K_s/K_g*(T_{h1}-T_{h2})+((K_{iso}/K_g)*(A_{iso\_m}/A_s)*(((T_{h1}-T_{h2})/2)-t_{sa}))\rightarrow 14$$

wherein:

$K_s$=thermal conductivity coefficient of said sensor housing;

$K_g$=thermal conductivity coefficient of human tissue;

$K_{iso}$=thermal conductivity coefficient of the outer insulation;

$A_{iso\_m}$=surface area of the outer insulation (same elevation as the insulation between the sensors);

$A_s$=end face of the sensor having the diameter of the insulation;

$t_{sa}$=boundary temperature at the outer surface of the insulation as measured by said third temperature sensor;

14=said compensation term; and, wherein, said constant parameter ($\alpha$) is a thermal conductance constant ($\alpha$) representing the thermal conductance between said outer wall of said housing and the ambient (U).

2. The arrangement of claim 1, wherein said compensation term is dependent upon said thermal conductance constant ($\alpha$).

3. The arrangement of claim 1, wherein said boundary temperature ($t_{sa}$) is computed from a boundary temperature formula in dependence upon said constant parameters ($\alpha$, $K_s$, $K_{iso}$) and in dependence upon said skin temperature ($T_{h1}$) measured by said first temperature sensor and said further temperature ($T_{h2}$) measured by said second temperature sensor.

4. The arrangement of claim 1, wherein said thermal conductance constant ($\alpha$) is assigned a value in a range of 10 $W/m^2K$ to 30 $W/m^2K$.

5. The arrangement of claim 3, wherein said boundary temperature formula is given by $$t_{sa}=\frac{\alpha\cdot T_{h2}-K_s\cdot(T_{h1}-T_{h2})+K_{iso}\cdot\left(\frac{T_{h1}+T_{h2}}{2}\right)}{\alpha+K_{iso}}.$$

* * * * *

UNITED STATES PATENT AND TRADEMARK OFFICE

CERTIFICATE OF CORRECTION

PATENT NO. : 7,299,090 B2
APPLICATION NO. : 11/339577
DATED : November 20, 2007
INVENTOR(S) : Jochim Koch It is certified that error appears in the above-identified patent and that said Letters Patent is hereby corrected as shown below:

Column 5:
Line 36: delete "$T_c$ ', " and substitute -- $T_c$, -- therefor.

Column 6:
Line 15: delete "$t_c$*$_{\_diff}$" and substitute -- $t_c''$ $_{\_diff}$ -- therefor.

Signed and Sealed this

Fifteenth Day of January, 2008

JON W. DUDAS
*Director of the United States Patent and Trademark Office*

UNITED STATES PATENT AND TRADEMARK OFFICE

CERTIFICATE OF CORRECTION

PATENT NO. : 7,299,090 B2 Page 1 of 1
APPLICATION NO. : 11/339577
DATED : November 20, 2007
INVENTOR(S) : Jochim Koch It is certified that error appears in the above-identified patent and that said Letters Patent is hereby corrected as shown below:

Column 7:
Lines 15 and 16: delete "$T_c' = T_{h1}+K_s/K_g * (T_{h1}-T_{h2}) + ((K_{iso}/K_g) * (A_{iso\_m}/A_s) * ((K_{iso}/K_g) * (A_{iso\_m}/A_s) * (((T_{h1}-T_{h2}) /2) - t_{sa}))\rightarrow 14$" and substitute $$-- \quad T_c' = T_{h1} + \frac{K_s}{K_g} \cdot (T_{h1} - T_{h2}) + \underbrace{\frac{K_{iso}}{K_g} \cdot \frac{A_{iso\_m}}{A_s} \cdot \left(\frac{T_{h1} + T_{h2}}{2} - t_{sa}\right)}_{14} \quad --$$

therefor.

Signed and Sealed this

First Day of July, 2008

JON W. DUDAS

*Director of the United States Patent and Trademark Office*